(12) United States Patent
Lumens et al.

(10) Patent No.: US 9,122,687 B2
(45) Date of Patent: Sep. 1, 2015

(54) CRASH RECOVERY FOR ATTENDED OPERATING SYSTEM INSTALLATIONS

(71) Applicant: Red Hat, Inc., Raleigh, NC (US)

(72) Inventors: Christopher Edward Lumens, Merrimack, NH (US); Maureen Strode, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 14 days.

(21) Appl. No.: 13/720,322

(22) Filed: Dec. 19, 2012

(65) Prior Publication Data

US 2014/0172924 A1  Jun. 19, 2014

(51) Int. Cl.
*G06F 17/30* (2006.01)
(52) U.S. Cl.
CPC .................. *G06F 17/3007* (2013.01)
(58) Field of Classification Search
CPC ................... G06F 17/30286; G06F 17/30595; G06F 9/542
USPC ........................................................ 707/812
See application file for complete search history.

(56) References Cited

U.S. PATENT DOCUMENTS

| | | | | |
|---|---|---|---|---|
| 6,446,260 B1 * | 9/2002 | Wilde et al. | .................. | 717/173 |
| 6,968,551 B2 * | 11/2005 | Hediger et al. | ............... | 717/174 |
| 7,711,755 B2 * | 5/2010 | Cruver | .......................... | 707/803 |
| 8,161,101 B2 * | 4/2012 | Bezanson et al. | ............ | 709/203 |
| 8,543,665 B2 * | 9/2013 | Ansari et al. | .................. | 709/218 |
| 8,671,404 B2 * | 3/2014 | DeHaan et al. | ................... | 718/1 |
| 2006/0282773 A1 * | 12/2006 | Kim | .............................. | 715/703 |

* cited by examiner

*Primary Examiner* — Rehana Perveen
*Assistant Examiner* — Dongming Wang
(74) *Attorney, Agent, or Firm* — Lowenstein Sandler LLP (57) ABSTRACT

An installer running on a computing device automates crash recovery of attended operating system installations. The installer initializes a provisioning event of an application on a computing device, presents an application configuration option for the application, receives a decision corresponding to the application configuration option, provisions the application based upon the decision, and updates an answer file with the decision. The installer also, in response to a detected provisioning event failure, generates a custom answer file, initializes a new provisioning event of the application on the computing device, detects the custom answer file, and provisions the application according to the custom answer file.

20 Claims, 4 Drawing Sheets

CRASH RECOVERY FOR ATTENDED OPERATING SYSTEM INSTALLATIONS

TECHNICAL FIELD

The embodiments of the disclosure relate generally to computing devices and, more specifically, relate to a mechanism for crash recovery of operating system installations.

BACKGROUND

Software provisioning is the process of selecting a target machine such as a server, loading the appropriate software operating system, device drivers, middleware, and applications, and customizing and configuring the system and the software to make it ready for operation. Software provisioning can entail a variety of tasks such as creating or changing a boot image, specifying parameters (e.g., IP address, IP gateway, etc.) to find associated network and storage resources) and then starting the machine and its newly loaded software.

Commonly, a system administrator will perform these tasks using various tools because of the complexity of these tasks. Typically, software provisioning can include the installation or reinstallation of software on a target machine. The installation of an operating system can become tedious because of the multiple prompts that should be addressed to properly configure an operating system. One tool used by the system administrator to ease the burden is known as an answer file. The answer file contains responses to the prompts that occur during the installation of the operating system. Unfortunately, the answer files are usually hand-crafted and sometimes time-consuming to create.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Described herein are methods and systems for automating recovery of attended operating system installations. Embodiments of the present disclosure provide an installer that automates crash recovery of attended operating system installations by initializing a provisioning event of an application on a computing device, and presenting an application configuration option for the application. The installer also receives a decision corresponding to the application configuration option, provisions the application based upon the decision, and updates an answer file with the decision. In one embodiment, the installer also, in response to a detected provisioning event failure, generates a custom answer file, initializes a new provisioning event of the application on the computing device, detects the custom answer file, and provisions the application according to the custom answer file.

Beneficially, the installer bypasses the need, upon attempting a reinstallation, to configure the myriad of options a second time because the installer updated the answer file with each decision and then generated a custom answer file based upon the decisions. The custom answer file automatically applies the configuration decisions and speeds up the installation process.

Figure 1:
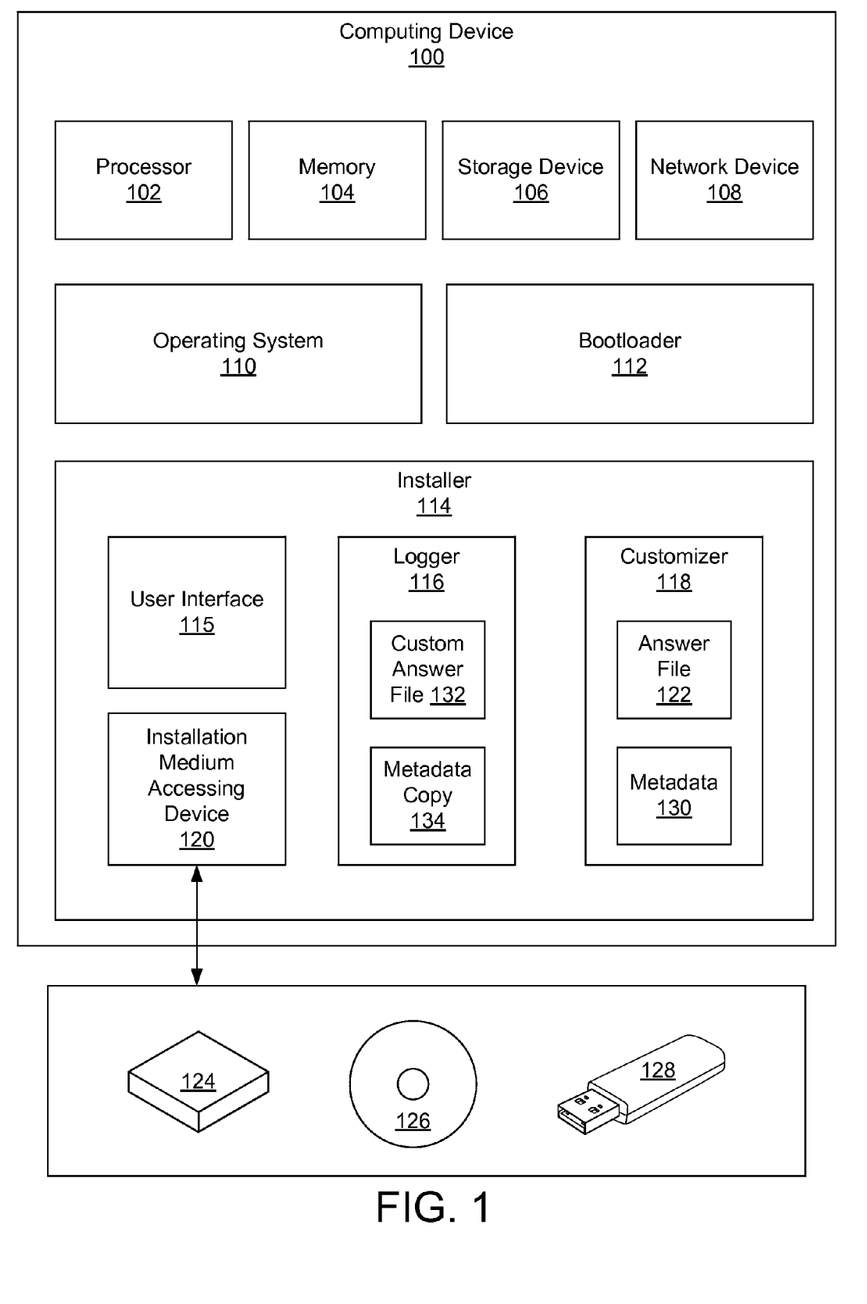
FIG. 1 illustrates one embodiment of a computing device, which is capable of executing an installer for crash recovery of attended operating system installations.

FIG. 1 illustrates one embodiment of a computing device 100, which is capable of executing an installer for crash recovery of attended operating system installations. As illustrated, the computing device 100 comprises a computing platform, which may be capable of, for example, executing an operating system 110, or in place of the operating system 110, a virtual machine for executing a virtual operating system, or a virtual-machine monitor (VMM). In some embodiments, the computing device 100 includes a processor 102, memory 104, storage devices 106, network devices 108, etc.

Upon powering up the computing device 100, the processor 102 can be configured to launch a bootloader 112. In one embodiment, the bootloader 112 is a program that loads a main operating system or runtime environment for the computing device 100 after the computing device 100 completes power-up self-tests (e.g., setting initial values for hardware devices). The bootloader 112 loads from nonvolatile storage, such as the storage device 106, an executable for loading other data and programs (e.g., operating system 110) which may be executed from memory 104. Examples of a bootloader capable of use in the present disclosure include, but are not limited to, BIOS, EFI, OpenBIOS, OpenBOOT, SLOF. The bootloader 112 may directly launch the operating system 110, or alternatively launch a secondary bootloader that loads the operating system 110.

In another embodiment, the bootloader 112 executes an installer 114. The installer 114 is, in one embodiment, an executable program that prepares applications, such as an operating system, to execute on a specific hardware platform. The installer 114 can be configured to provision, on the computing device 100, applications and/or platforms. The act of provisioning may refer to installing applications and/or platforms. One type of application that may be provisioned on bare hardware is, for example, the operating system 110. Examples of applications and/or platforms include, but are not limited to, Red Hat® Enterprise Linux® developed by Red hat, Inc. of Raleigh N.C., Solaris™ developed by Sun Microsystems, Inc. of Santa Clara, Calif., Windows® developed by Microsoft Corporation of Redmond, Wash., etc. The installer 114 includes a user interface 115, a logger 116, a customizer 118, and an installation medium accessing device 120.

The user interface 115 can be configured to present, to a user, information regarding the installation of the operating system 110. The user interface 115 may be a textual user interface (e.g., command line), or alternatively, a graphical user interface. The user interface 115 is configured to receive, via user input devices (e.g., keyboard, mouse, etc.) of the computing device 100, prompts from the user. Examples of prompts and/or user preferences include, but are not limited to, the type of keyboard used, the time zone and/or locale of the computing device 100, passwords, the type and number of network connections, the roles (e.g., email server, file server, etc.) to be installed, the hard disk partition scheme (e.g., size, quantity, and type of storage devices), and user account information.

The customizer 118, in one embodiment, allows the user to bypass all of the user prompts by predefining the user preferences. In one implementation, the customizer 118 uses an answer file 122 to allow the user to bypass all of the user prompts. The answer file 122 can include data that specifies setup options, to be accessed by the installer 114, for the computing device 100. For example, the answer file 122 can include data that describes how to set up the operating system 110 for the computing device 100. The data in the answer file 122 is hereinafter referred to as an "answer" or "answers." The answer file 122 may also include answers that specify parameters (e.g., the user preferences described above) that can be used to complete a software installation. For example, the answer file 122 may include parameters that relate to, for example, and not limited to, language selection, authentication schemes, firewall configuration, package selection, etc. The answer file 122 may also include scripts to be executed before, during, or after the installation of the operating system 110. For example, the answer file 122 may contain a partial list of answers and one or more scripts can be executed to prompt a user for data specifying additional answers. The scripts may be written in a programming language, such as, and not limited to, Python. Stated differently, the answer file 122 specifies the intended configuration of the operating system 110 being provisioned.

The answer file 122 may comprise a text file containing data that can be edited by a text editor. In another embodiment, the answer file 122 is written in a special purpose text. The answer file 122 may be modified, or written, as described above, to provide answers for different operating systems. Examples of an answer file 122 can include, and are not limited to, kickstart files, for example, for the Red Hat® Enterprise Linux® operating system, AutoYAST Answer files used in Novell® SuSe Linux, and Sun® Solaris Jumpstart files. The answer file 122 may be stored locally in the storage disk 106, remotely on a network storage device, or on a removable storage device with installation media of the operating system 110. Accordingly, the installer 114, via the installation medium accessing device 120 (e.g., network interface, CDROM, USB drive, etc), may access the answer file 122 by various network protocols (e.g., NFS, FTP, HTTP, etc.) or by accessing a remote network storage device 124, a CD-ROM 126, a USB drive 128, or the storage device 106.

The customizer 118 can be configured to maintain metadata 130 related to the provisioning of the operating system 110. The metadata 130 may refer to any additional information that, depending on the operating system 110 being provisioned, helps in the provisioning of the operating system 110. For example, with reference to Red Hat® Enterprise Linux®, during the installation process, the installer 114 may download, over a network, package installation information. The package installation information can include available packages for installation, and the dependencies of those packages.

The logger 116 can be configured to generate a log of the installation process. The log, in one embodiment, includes a record of the above described user preference or configuration changes and a record of any metadata used during the provisioning process. The logger 116 can capture input from the user related to the user-configurable options (e.g., locale, time zone, language, selected packages, etc.), and upon the detection of a failed provisioning event, can generate a custom answer file 132 including the user-configurable options. The logger 116 also maintains a metadata copy 134, which is a mirror of the metadata 130.

The installer 114 is further configured to prompt, via the user interface 115, the user in the event of a provisioning failure to determine if the user would like to store a copy of the custom answer file 132 and/or the metadata copy 134. This beneficially allows the user to restart a provisioning process with the custom answer file 132 and metadata copy 134 and bypass all or most of the prompts during the provisioning of the operating system. In another embodiment, the installer 114 is configured to detect a failed provisioning attempt, record the custom answer file 132 and metadata copy 134 to a storage device (e.g., storage device 106, USB drive 128, etc.), and initialize a new provisioning event of the operating system 110 based on the custom answer file 132 and the metadata copy 134. The installer 114 is also configured to detect the presence of an answer file 122, or a custom answer file 132 upon initializing a provisioning event. The installer 114 can analyze one or more storage device to identify the presence of the answer file 122 or custom answer file 132. If multiple configuration files (e.g., answer file 122 or 132, or other answer files) are detected, the installer 114 prompts the user, via the user interface 114, to select one, or none, of the available answer files. The installer 114 then provisions the operating system 110 based on the input received from the user.

Figure 2:
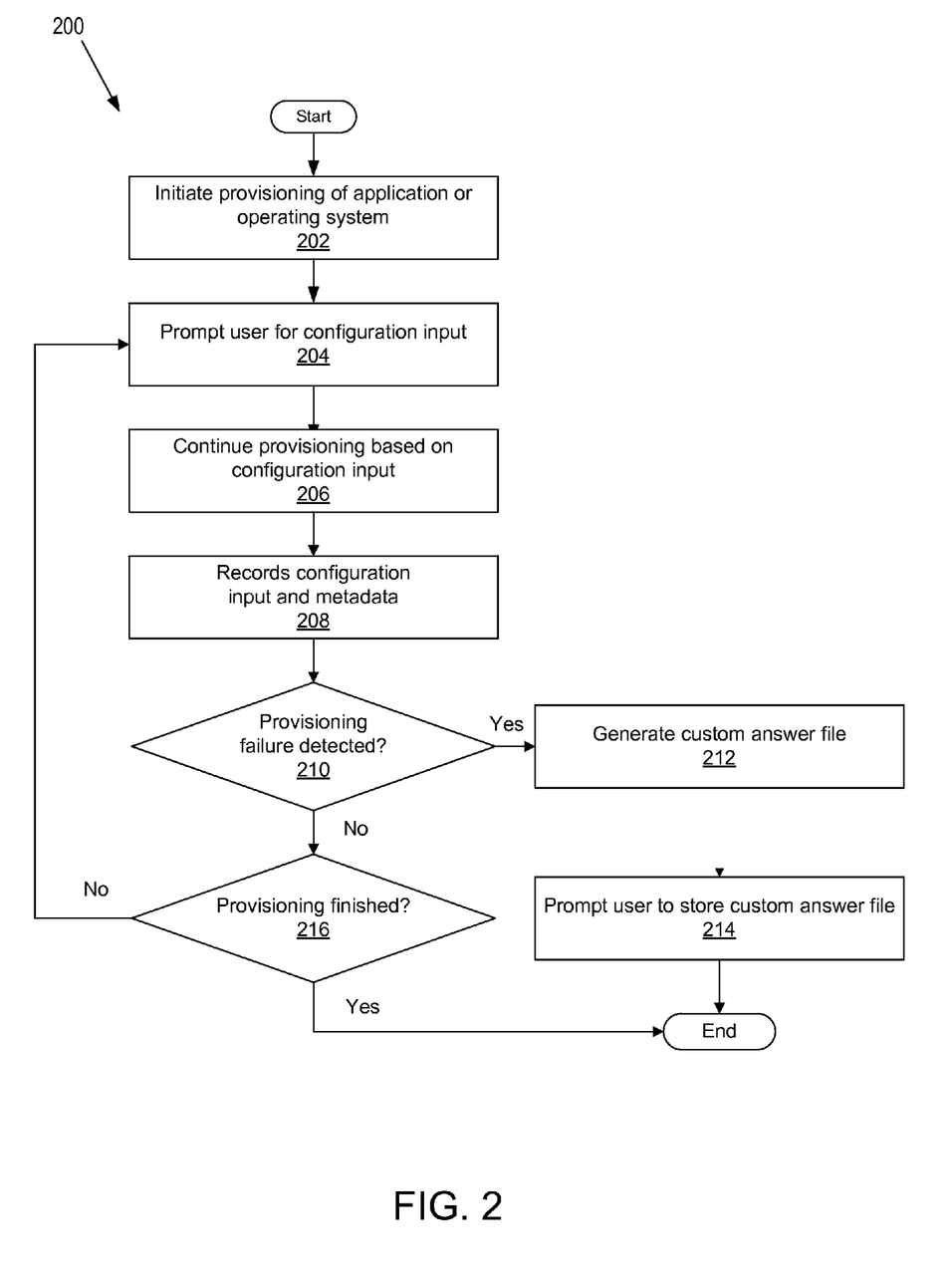
FIG. 2 illustrates a flow diagram of one embodiment of a method for generating a custom answer file.

FIG. 2 illustrates a flow diagram of one embodiment of a method 200 for generating a custom answer file. The method may be performed by processing logic that may comprise hardware (circuitry, dedicated logic, etc.), software (such as is run on a general purpose computer system or a dedicated machine), or a combination of both. In one embodiment, the method is performed by an installer (e.g., installer 114 of FIG. 1).

The method 200 starts and the processing logic, at block 202, initiates provisioning of an application or operating system. In one embodiment, the processing logic initiates provisioning of software including, but not limited to, virtual machines, virtual machine operating systems, or applications operating within an operating system, or virtual operating system (e.g., web servers, file servers, databases, etc.). The processing logic, at block 204, then begins to prompt the user for configuration input. In one embodiment, the provisioning logic prompts, via a user interface, the user to make a decision regarding provisioning options. Examples of provisioning options, or user-configurable options, as described above, can include locale, time zone, language, etc.

At block 206, the processing logic continues to provision the operating system or application based on input received from the user, and the processing logic records, at block 208, the input from the user into a temporary answer file. The answer file, in one embodiment, is a answer file. The processing logic, in one example, also records metadata at block 208.

If, at block 210, the processing logic detects a provisioning failure, the processing logic generates, at block 212, a custom answer file. The custom answer file comprises, in one embodiment, a custom answer file and metadata copy generated according to the user input received throughout the provisioning process and any metadata used.

At block 214, the processing logic prompts the user to store the custom answer file. For example, the processing logic may prompt the user to store the custom answer file on a removable storage device as described above with reference to FIG. 1. In another embodiment, the processing logic may prompt the user to input credentials to enable the storing of the custom answer file on a remote storage device. The custom answer file can then be referenced during a subsequent provisioning of the application to refrain prompting the user for answers that the user has provided previously during the prior provisioning of the application.

While the processing logic does not detect a provisioning failure, the processing logic iteratively processes the provisioning of the operating system, pausing to prompt for user input when necessary (e.g., at block 204). If the processing logic, at block 216, detects that provisioning is finished, the method 200 ends. Alternatively, the processing logic returns to block 204 to continue provisioning the operating system.

Figure 3:
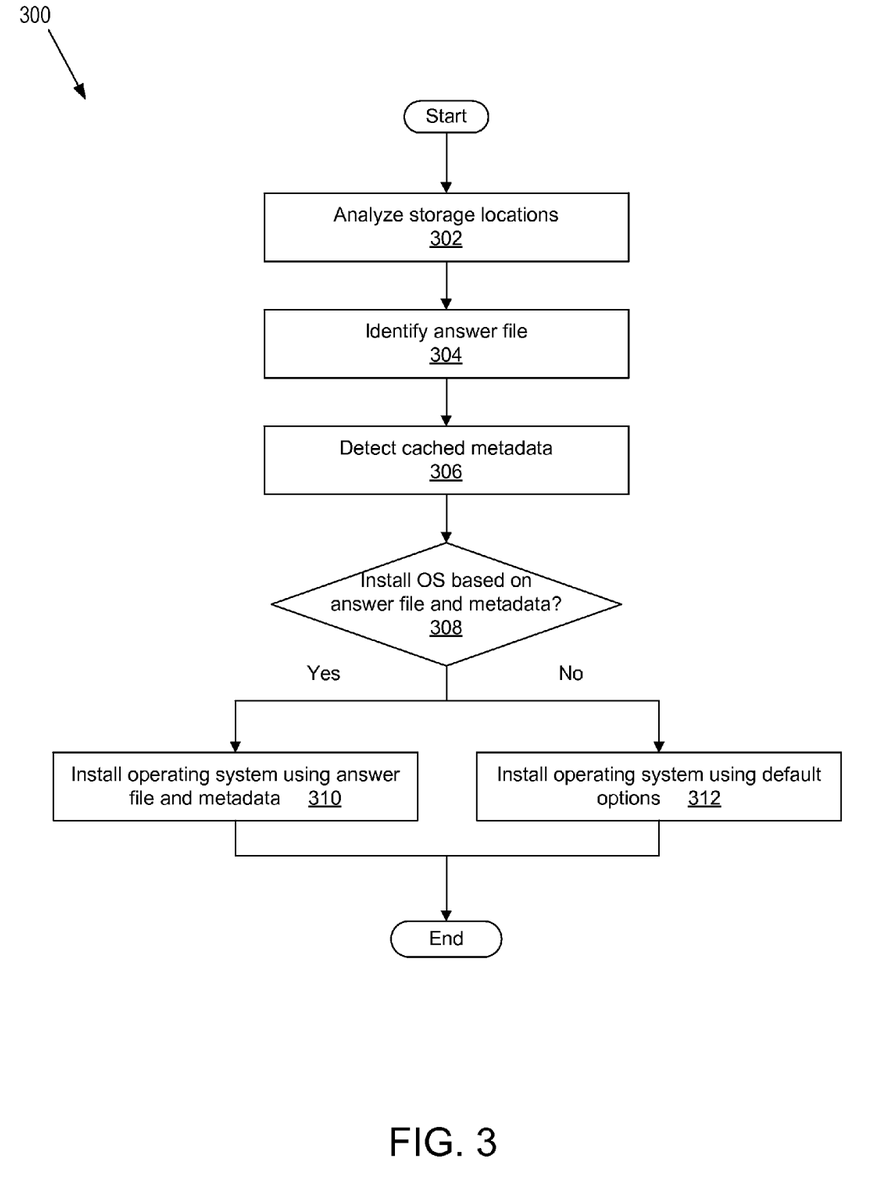
FIG. 3 illustrates a flow diagram of one embodiment of a method for provisioning an operating system based on a custom answer file.

FIG. 3 illustrates a flow diagram of one embodiment of a method 300 for provisioning an operating system based on a custom answer file. The method is performed by processing logic that may comprise hardware (circuitry, dedicated logic, etc.), software (such as is run on a general purpose computer system or a dedicated machine), or a combination of both. In one embodiment, the method is performed by an installer (e.g., installer 114 of FIG. 1).

The method 300 starts and the processing logic, at block 302, analyzes storage locations associated with the computing device 100. The storage locations include attached storage devices, and removable storage devices, as described above with reference to FIG. 1. At block 304, the processing logic identifies a custom answer file in a storage device. At block 306, the processing logic also detects the presence of cached metadata. In one embodiment, the processing logic determines if cached metadata is present by determining if a file with a predetermined file extension or file name is present.

At block 308, the processing logic determines whether to install or provision the operating system based on the found custom answer file and metadata file, if any. In one embodiment, the processing logic prompts the user to determine whether to install based on the custom answer file or not. The processing logic, via a user interface, may allow the user to select the custom answer file, provide a different answer file, select a different answer file, or select to provision the operating system without the use of any answer file. In another embodiment, the processing logic may determine whether to use the custom answer file based on a number of factors including, but not limited to, the number of previous provisioning failures, the completeness of the answer file (e.g., does the answer file contain a substantial amount of answers), whether a user has selected or provided a different answer file, etc.

If the processing logic, at block 308, determines to use the custom answer file and metadata (e.g., metadata file), then the processing logic, at block 310, installs the operating system using the custom answer file and metadata file. Otherwise, at block 312, the processing logic installs the operating system using default options.

The custom answer file, depending upon when a provisioning failure event occurs (see FIG. 2), may include a partial list of answers for provisioning an operating system. For example, the processing logic may have prompted for user input regarding which language to provision the operating system with, but then failed prior to prompting the user for the locale of the computing device. As such, the custom answer file may include a partial list of answers. In this example, the processing logic proceeds with the provisioning of the operating system, using the custom answer file to supply answers to configuration prompts, until the answers are exhausted. The processing logic then begins to prompt the user for answers as needed to complete the installation.

Figure 4:
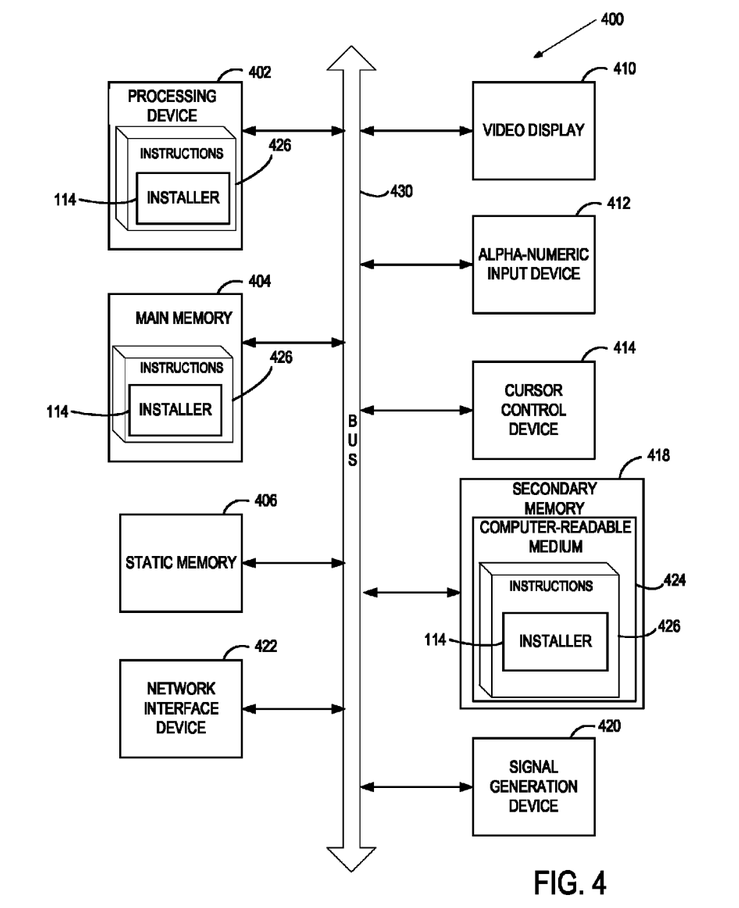
FIG. 4 is a diagram of one embodiment of a computer system for facilitating automated crash recovery of operating system installations.

FIG. 4 is a diagram of one embodiment of a computer system for facilitating automated crash recovery of operating system installations. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 418 (e.g., a data storage device in the form of a drive unit, which may include fixed or removable computer-readable storage medium), which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 418 may include a machine-readable storage medium (or more specifically a computer-readable storage medium) 424 on which is stored one or more sets of instructions 426 embodying any one or more of the methodologies or functions described herein. In one embodiment, the instructions 426 include instructions for the installer 114. The instructions 426 may also reside, completely or at least partially, within the main memory 404 and/or within the processing device 402 during execution thereof by the computer system 400, the main memory 404 and the processing device 402 also constituting machine-readable storage media.

The computer-readable storage medium 424 may also be used to store the instructions 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 426, components and other features described herein can be implemented as discrete hardware components or integrated in the functionality of hardware components such as ASICS, FPGAs, DSPs or similar devices. In addition, the instructions 426 can be implemented as firmware or functional circuitry within hardware devices. Further, the instructions 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initializing," "presenting," "receiving," "provisioning," "updating," "detecting," "retrieving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In the preceding description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
   initializing, by a processing device, an installation of an application on a computing device;
   prompting, during the installation of the application, a user to provide at least one answer for an application configuration option, the at least one answer pertaining to the installation of the application;

receiving user input of the at least one answer to the application configuration option;
detecting a failure in the installation;
storing the at least one answer in a custom answer file in a data store in response to detecting the failure;
restarting the installation of the application;
determining whether to use the custom answer file for the restarted installation in view of an amount of answers in the custom answer file; and
bypassing prompting of the user during the restarted installation by using the at least one answer stored in the custom answer file during the restarted installation of the application if the amount of answers in the custom answer file meets a certain amount.

2. The method of claim 1, wherein the custom answer file comprises a kickstart file.

3. The method of claim 2, wherein the custom answer file further comprises at least one metadata file, the at least one metadata file comprising metadata referring to additional information downloaded for the installation.

4. The method of claim 1, further comprising:
iteratively until installation is one of successful or failed,
presenting a new application configuration option for the application;
receiving a new decision corresponding to the new application configuration option;
installing the application based upon the new decision; and
updating the custom answer file with the new decision.

5. The method of claim 4, further comprising:
detecting an installation event failure; and
generating a second custom answer file in response to the installation event failure.

6. The method of claim 5, further comprising:
initializing a new installation event of the application on the computing device;
detecting the second custom answer file; and
installing the application according to the second custom answer file, without requesting user input.

7. The method of claim 6, further comprising:
retrieving the second custom answer file from a removable storage device comprising instructions that, when executed, causes the processing device to install the application.

8. A non-transitory computer readable storage medium including instructions that, when executed by a processing device, cause the processing device to:
initialize, by the processing device, an installation of an application on a computing device;
prompt, during the installation of the application, a user to provide at least one answer for an application configuration option, the at least one answer pertaining to the installation of the application;
receive user input of the at least one answer to the application configuration option;
detect a failure in the installation;
store the at least one answer in a custom answer file in a data store in response to detecting the failure;
restart the installation of the application;
determine whether to use the custom answer file for the restarted installation in view of an amount of answers in the custom answer file; and
bypass prompting of the user during the restarted installation by using the at least one answer stored in the custom answer file during the restarted installation of the application if the amount of answers in the customer answer file meets a certain amount.

9. The computer readable storage medium of claim 8, wherein the custom answer file comprises a kickstart file.

10. The computer readable storage medium of claim 9, wherein the custom answer file further comprises at least one metadata file, the at least one metadata file comprising metadata referring to additional information downloaded for the installation.

11. The computer readable storage medium of claim 8, wherein the processing device is further to:
iteratively until installation is one of successful or failed,
present a new application configuration option for the application;
receive a new decision corresponding to the new application configuration option;
install the application based upon the new decision; and
update the custom answer file with the new decision.

12. The computer readable storage medium of claim 11, wherein the processing device is further to:
detect an installation event failure; and
generate a second custom answer file in response to the installation event failure.

13. The computer readable storage medium of claim 12, wherein the processing device is further to:
initialize a new installation event of the application on the computing device;
detect the second custom answer file; and
install the application according to the second custom answer file, without requesting user input.

14. The computer readable storage medium of claim 13, wherein the processing device is further to:
retrieve the second custom answer file from a removable storage device comprising instructions that, when executed, causes the processing device to install the application.

15. A system comprising:
a memory to store instructions for providing an installer; and
a processing device operatively coupled to the memory to:
initialize installation of an application on a computing device;
prompt, during the installation of the application, a user to provide at least one answer for an application configuration option, the at least one answer pertaining to the installation of the application;
receive user input of the at least one answer to the application configuration option;
detect a failure in the installation
store the at least one answer in a custom answer file in a data store in response to detecting the failure;
restart the installation of the application;
determine whether to use the custom answer file for the restarted installation in view of an amount of answers in the custom answer file; and
bypass prompting of the user during the restarted installation by using the at least one answer stored in the custom answer file during the installation of the application if the amount of answer in the customer answer file meets a certain amount.

16. The system of claim 15, wherein the custom answer file comprises a kickstart file.

17. The system of claim 16, wherein the custom answer file further comprises at least one metadata file, the at least one metadata file comprising metadata referring to additional information downloaded for the installation.

18. The system of claim 15, wherein the processing device is further to:
iteratively until installation is one of successful or failed, present a new application configuration option for the application;
receive a new decision corresponding to the new application configuration option;
install the application based upon the new decision; and
update the custom answer file with the new decision.

19. The system of claim 18, wherein the processing device is further to:
detect an installation event failure; and
generate a second custom answer file in response to the installation event failure.

20. The system of claim 19, wherein the processing device is further to:
initialize a new installation event of the application on the computing device;
detect the second custom answer file; and
install the application according to the second custom answer file, without requesting user input.

* * * * *